(12) United States Patent
Chin-King et al.

(10) Patent No.: US 10,015,016 B2
(45) Date of Patent: Jul. 3, 2018

(54) METHOD AND APPARATUS FOR MAINTAINING A CENTRALIZED REPOSITORY THAT STORES ENTITLEMENT CAPABILITY FOR AUTHORIZED SIGNATORIES

(71) Applicant: Bank of America Corporation, Charlotte, NC (US)

(72) Inventors: Selene Chin-King, Brooklyn, NY (US); Gerardo R. Garcia, Charlotte, NC (US); Barbara J. Costa, Grants Pass, OR (US); Maia H. Hardin, Fort Mill, SC (US); Sean Beaty, Charlotte, NC (US); Lynette M. Galvan, San Francisco, CA (US); Aimee Jones, Tarpon Springs, FL (US); Cheryl Ledoux, Charlotte, NC (US); Michelle D. Nichols, Rock Hill, SC (US); Shelvia Barry, Greensboro, NC (US); Susan Thrasher, Charlotte, NC (US); Chad B. Vought, Monroe, NC (US)

(73) Assignee: Bank of America Corporation, Charlotte, NC (US)

( * ) Notice: Subject to any disclaimer, the term of this patent is extended or adjusted under 35 U.S.C. 154(b) by 375 days.

(21) Appl. No.: 14/608,079

(22) Filed: Jan. 28, 2015

(65) Prior Publication Data
US 2016/0218878 A1    Jul. 28, 2016

(51) Int. Cl.
*H04L 9/32*    (2006.01)
*G06F 21/64*    (2013.01)

(52) U.S. Cl.
CPC .......... *H04L 9/3247* (2013.01); *G06F 21/645* (2013.01)

(58) Field of Classification Search
None
See application file for complete search history.

(56) References Cited

U.S. PATENT DOCUMENTS

| | | | |
|---|---|---|---|
| 5,689,567 A | 11/1997 | Miyauchi | |
| 5,787,175 A * | 7/1998 | Carter | G06F 21/6209 |
| | | | 707/999.008 |
| 6,671,805 B1 | 12/2003 | Brown et al. | |
| 6,796,489 B2 | 9/2004 | Slater et al. | |
| 7,069,443 B2 | 6/2006 | Berringer et al. | |

(Continued)

*Primary Examiner* — Azizul Choudhury
(74) *Attorney, Agent, or Firm* — Weiss & Arons LLP; Michael A. Springs, Esq.

(57) ABSTRACT

An apparatus for removing an individual as an authorized signatory is provided. The apparatus may include a transceiver. The transceiver may be configured to receive a request to remove the individual as the authorized signatory in a centralized repository. The transceiver may be further configured to transmit a request to remove the individual as the authorized signatory. The removal of the individual may include removing the individual as a listed authorized signatory in the centralized repository. The removal may also include transmitting an instruction to reclassify one or more associated signature documents. The associated signature documents may corresponding to authorized signatory documents for the individual. The instruction to reclassify may include an instruction to categorize the individual's authorized signatory documents as non-designated signature documents.

19 Claims, 5 Drawing Sheets

(56) References Cited

U.S. PATENT DOCUMENTS

| | | | |
|---|---|---|---|
| 7,237,114 B1* | 6/2007 | Rosenberg | G06F 21/6209 |
| | | | 705/67 |
| 7,958,349 B2 | 6/2011 | Parkinson | |
| 8,010,796 B2 | 8/2011 | Lee et al. | |
| 8,392,703 B2 | 3/2013 | Lin et al. | |
| 8,484,723 B2 | 7/2013 | Oswalt | |
| 2003/0217111 A1* | 11/2003 | McKay | G06F 17/3089 |
| | | | 709/207 |
| 2003/0220855 A1* | 11/2003 | Lam | G06Q 30/04 |
| | | | 705/34 |
| 2005/0033813 A1* | 2/2005 | Bhogal | G06F 17/24 |
| | | | 709/206 |
| 2005/0102243 A1* | 5/2005 | Kinsella | G06Q 20/04 |
| | | | 705/67 |
| 2008/0147790 A1* | 6/2008 | Malaney | G06Q 10/00 |
| | | | 709/203 |
| 2009/0094460 A1 | 4/2009 | Dedek | |
| 2010/0158326 A1 | 6/2010 | Takeda | |
| 2011/0093777 A1 | 4/2011 | Dunn et al. | |
| 2014/0019762 A1 | 1/2014 | Sabin | |
| 2014/0164765 A1 | 6/2014 | Hernandez Encinas et al. | |
| 2014/0245135 A1 | 8/2014 | Pravetz | |
| 2015/0213404 A1* | 7/2015 | Follis | G06Q 10/10 |
| | | | 705/317 |

* cited by examiner

METHOD AND APPARATUS FOR MAINTAINING A CENTRALIZED REPOSITORY THAT STORES ENTITLEMENT CAPABILITY FOR AUTHORIZED SIGNATORIES

FIELD OF TECHNOLOGY

This application relates to database storage. Specifically, this application relates to databases for storing information relating to entitlement capabilities and authorized signatories associated therewith.

BACKGROUND OF THE DISCLOSURE

Repositories for storing information relating to individuals' entitlement capabilities within an entity—for example, information regarding who possesses signatory authority for an entity, and to what areas the individual's signatory authority extends—are typically not maintained in electronic form. Rather, such information and associated documentation is usually stored in hard copies.

It would be desirable to store such information electronically.

It would be further desirable to display such stored information in a way that enables efficient manipulation of such information, when necessary.

SUMMARY OF THE INVENTION

A method for creating a centralized repository with entitlement capability for authorized signatories is provided. The method may include creating a centralized repository. The centralized repository may provide entitlement capability for one or more authorized signatories. The centralized repository may further provide access to one more signature documents associated with the one or more authorized signatories. The method may also include receiving entitlement authorization for the one or more signatories. In addition, the method may include displaying, on a display, a hierarchal display of the one or more authorized signatories. The hierarchal display may illustrate lines of authority. The lines of authority may extend from the one or more authorized signatories, preferably in at least a partially vertical orientation, to each of their respective authorizers.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
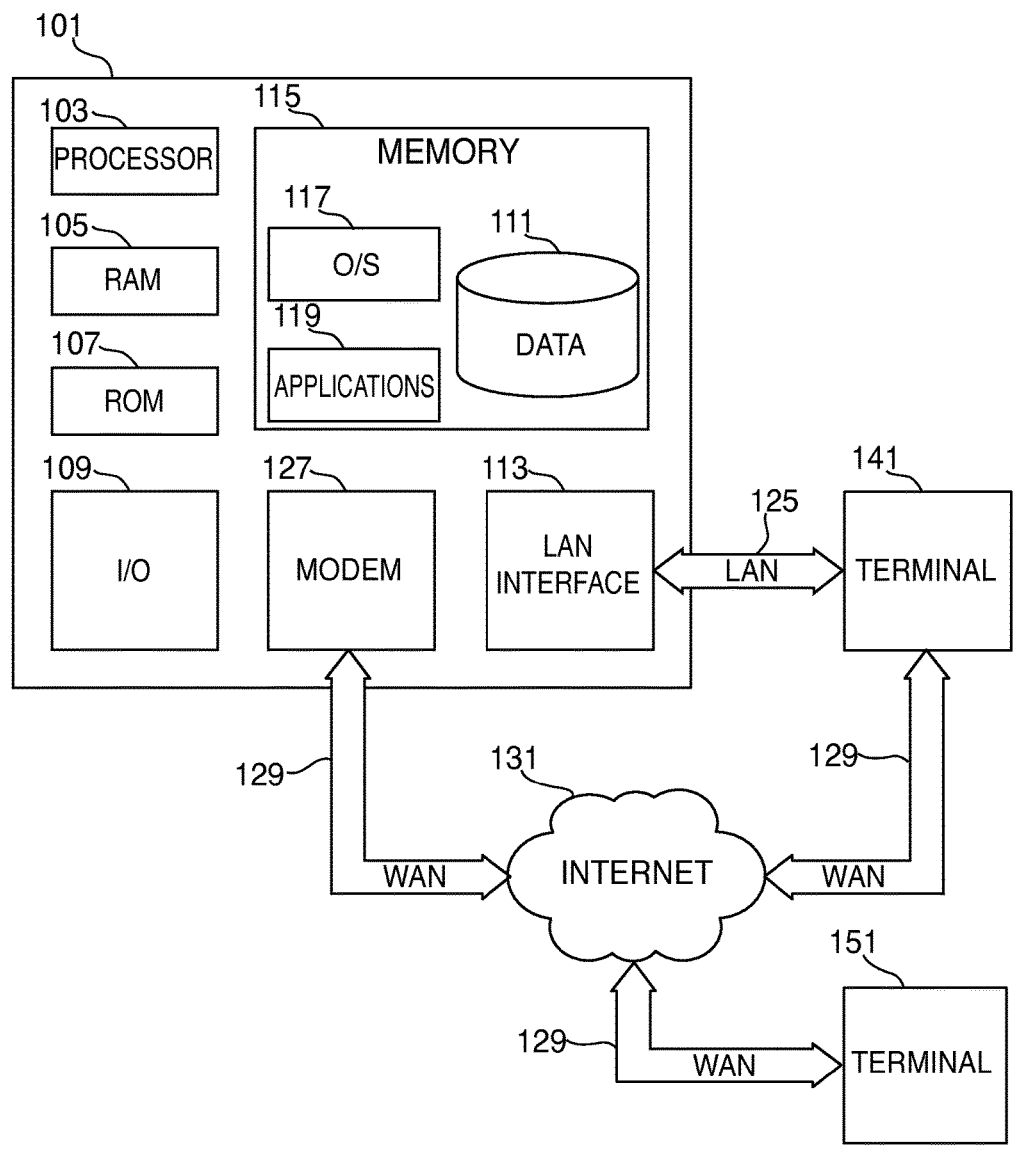
FIG. 1 shows an illustrative apparatus in accordance with principles of the invention.

Apparatus, methods and media (collectively referred to herein as a "system") for creating a centralized repository with entitlement capability for authorized signatories are provided.

For the sake of illustration, the invention will be described as being performed by a "system." The "system" may include one or more of the features of the apparatus and methods that are shown or described herein and/or any other suitable device or approach. The "system" may be provided by an entity. The entity may be an individual, an organization or any other suitable entity.

The system may include a repository. The repository may be a centralized repository. The centralized repository may provide one or more capabilities.

The repository may provide entitlement capabilities. For example, the repository may provide entitlement capability to an individual. The repository may provide entitlement capability for a signatory. The signatory may be an authorized signatory. The repository may be considered centralized as it may provide a repository for preferably all of, or the majority of, the entitlement capabilities for an entity.

The entitlement capability for the signatory may include entitlement to access one or more documents.

The repository may provide access to one or more documents. The document may include a signature document. The signature document may be associated with a signatory. The signature document may be associated with a plurality of signatories. The signatory may be an authorized signatory.

The system may receive entitlement authorization. The entitlement authorization may be received for the one or more signatories. The entitlement authorization may be provided to the centralized repository.

The system may include a display. The system may display information on the display. The system may display a hierarchal display. The hierarchal display may include a hierarchal map.

The hierarchal display may include a display of one or more of the authorized signatories. The hierarchal display may illustrate lines of authority. The lines of authority may include lines of authority from one or more authorized signatories. The lines of authority may include lines of authority to an authorizer. The authorizer may be an authorizer for a signatory. The line of authority may be a line of authority from an authorized signatory to an authorizer.

The system may link one or more signatories. The one or more signatories may be linked within the centralized repository. The one or more signatories may be linked to one or more signature documents. The signature documents may be associated with the signatories.

The system may aggregate the one or more signature documents. The one or more signature documents may be aggregated within the centralized repository.

The system may provide access to the one or more signature documents. Access may be provided within the centralized repository.

The system may designate one or more signature documents. The signature document may be designated within the centralized repository. The signature document may be designated as a current version. The signature document may be designated as the most current version. The signature document may be designated as the most current version of the signature documents.

The system may remove an individual from the repository. The system may receive a request to remove the individual from the repository. The request may be received via the centralized repository.

The individual may be removed as an authorized signatory. The individual may be removed from the centralized repository.

The removal of the individual may include removing the individual as a listed authorized signatory. The individual may be removed from the centralized repository as a listed authorized signatory.

The system may attempt to reclassify one or more documents. The system may reclassify one or more signature documents. The signature documents may be associated with one or more authorized signatories.

The associated signature documents may correspond to signatory documents. The signatory documents may be authorized signatory documents. The signatory documents may correspond to documents for an individual.

The system may reclassify the one or more documents by categorizing the documents. The categorizing may include categorizing the individual's documents. The individual's documents may include authorized signatory documents for the individual. The individual's documents may be categorized as non-designated signature documents.

The system may remove the classification of the associated signature documents for the individual. The classification may include classifying the associated signature documents for the individual as a current version of the associated signature documents. The classification may include classifying the associated signature documents for the individual as the most current version of the associated signature documents.

The system may remove the one or more associated signature documents from the centralized repository. The removed associated signature documents may include non-designated signature documents.

The system may receive a request to add an individual as a signatory. The request may include a request to add an individual as an authorized signatory. The request may be received via the centralized repository.

The system may add the individual as an authorized signatory. The individual may be added as a listed authorized signatory. The individual may be added as a listed authorized signatory in the centralized repository.

The system may receive a first signature document. The first signature document may be received from the individual. The first signature document may be received from any suitable entity or individual.

The first signature document may be received via the centralized repository. The first signature document may be linked. The document may be linked with the authorized signatory.

The system may receive a second signature document. The second signature document may be received via the centralized repository.

The system may link the second signature document. The second signature document may be linked with the authorized signatory. The second signature document may be designated as the current signature document version.

The system may create a centralized repository. The centralized repository may be configured with entitlement capabilities. The entitlement capabilities may include capability to entitle authorized signatories.

The centralized repository may provide entitlement capability. The entitlement capability may be provided for one or more authorized signatories. The centralized repository may provide access to one or more signature documents. The signature documents may be associated with the one or more authorized signatories.

The system may be configured to receive entitlement authorization for the one or more signatories.

The system may link the one or more signatories to the one or more signature documents. The one or more signature documents may be associated with the signatories.

The centralized repository may aggregate the one or more signature documents.

The centralized repository may provide access to the one or more signature documents. The centralized repository may designate the one or more signature documents as the most current version of the signature documents.

The system may remove an individual as a signatory. The system may remove the individual as an authorized signatory.

The system may receive a request to remove the individual. The request may include a request to remove the individual as the authorized signatory. The individual may be designated as the authorized signatory in the centralized repository.

The system may transmit a request. The request may include a request to remove the individual as the authorized signatory. The removal may include removing the individual as a listed authorized signatory. The individual may be listed as the authorized signatory in the centralized repository.

The system may transmit an instruction or set of instructions. The instruction may include an instruction to reclassify one or more documents. The one or more documents may be one or more associated signature documents.

The associated signature documents may correspond to authorized signatory documents. The authorized signatory documents may correspond to the individual.

The instruction to reclassify may include categorizing the individual's authorized signatory documents as non-designated signature documents.

The system may receive an instruction to remove the classification. The classification may be a classification of the associated signature documents. The classification may include classification of the associated signature documents as the most current version of the associated signature documents.

The system may transmit an instruction. The instruction may include an instruction to remove the one or more associated signature documents from the centralized repository.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other devices. These devices may be identical to system 100 or different. The differences may be related to hardware components and/or software components.

Figure 2:
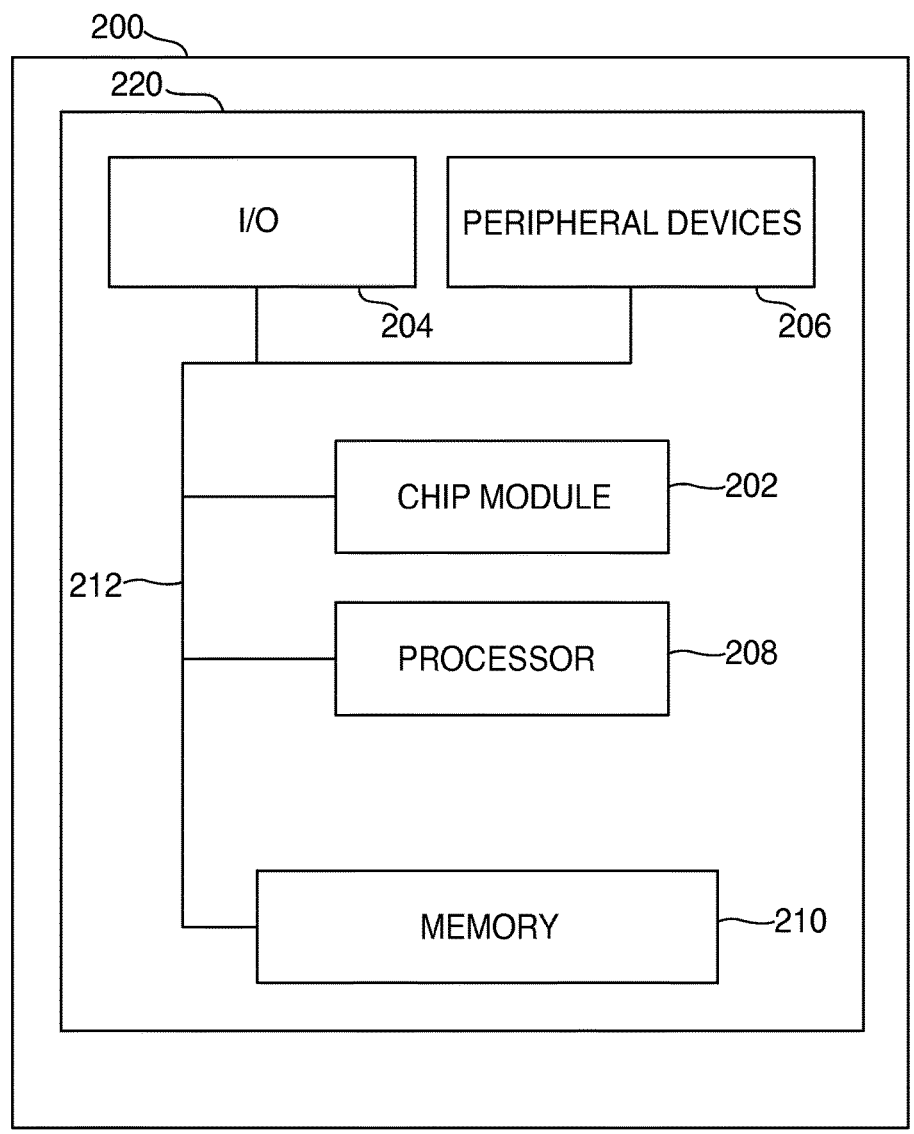
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data and/or determine signatory entitlement requirements and machine-readable memory 210.

Machine-readable memory 210 may be configured to store in machine-readable data structures: information pertaining to a signatory, information pertaining to an administrator of the repository and the signatories which he may oversee, the current time, information pertaining to historical entitlements and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
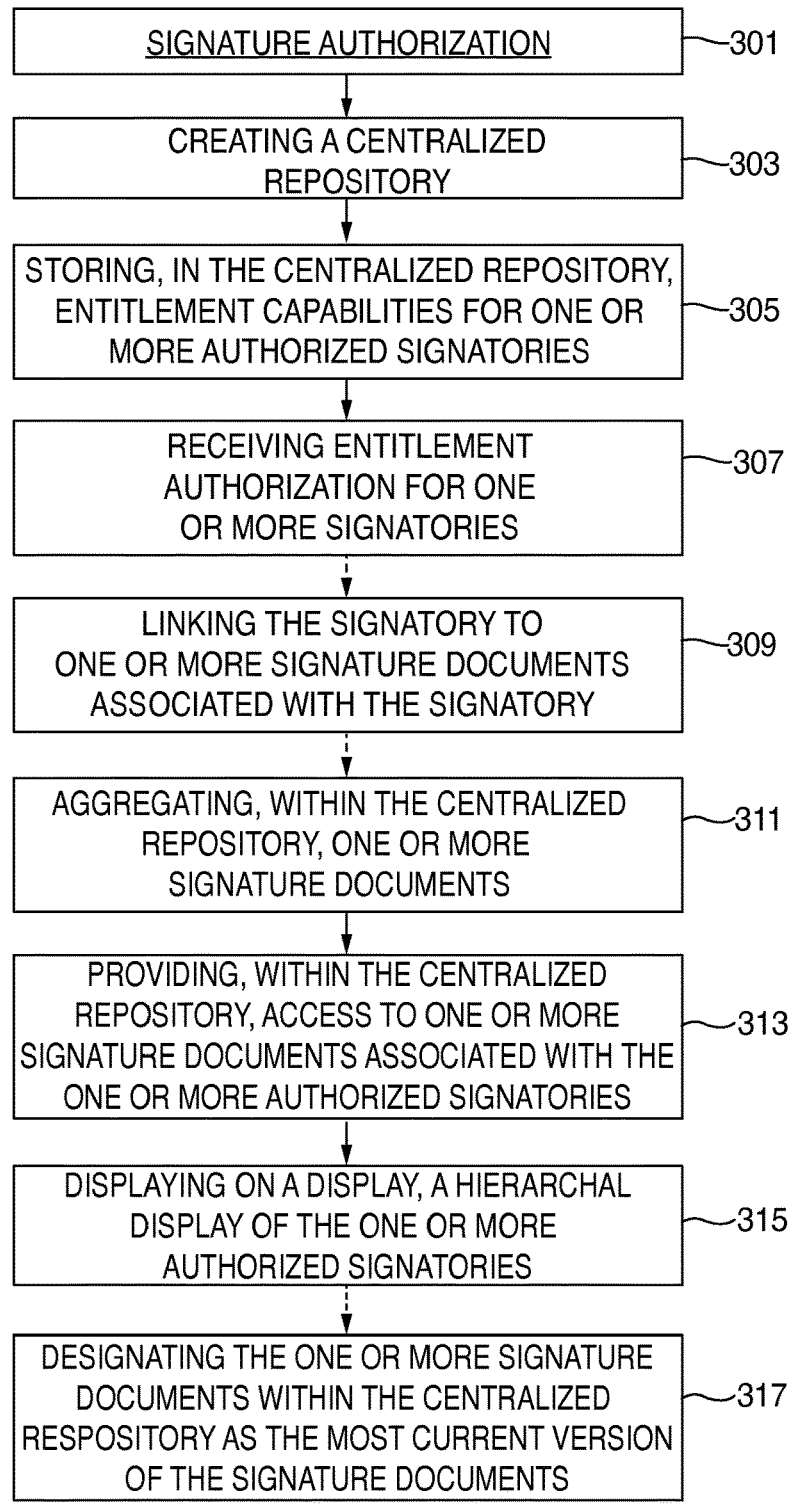
FIG. 3 shows an illustrative flow diagram according to certain embodiments.

FIG. 3 shows illustrative process 301 for signature authorization.

Process 301 may begin at step 303. At step 303, the system may create a repository. The repository may include a centralized repository.

At step 305, the system may store data or information in the centralized repository. The system may store entitlement capabilities. The entitlement capabilities may include capabilities for one or more authorized signatories.

At step 307, the system may receive authorization. The authorization may include entitlement authorization. The entitlement authorization may be received for one or more signatories.

At step 309, the system may link a signatory. The signatory may be linked to one or more signature documents. The one or more signature documents may be associated with the signatory.

At step 311, the system may aggregate documents. The documents may include signature documents. The documents may be aggregated within the centralized repository.

At step 313, the system may provide access. Access may be provided within the centralized repository. Access may be provided to one or more signature documents. The one or more signature documents may be associated with the one or more authorized signatories.

At step 315, the system may display a display. The display may be a hierarchal display. The display may include a hierarchal map. The display may be displayed on any suitable display. The hierarchal display may include one or more authorized signatories.

At step 317, the system may designate the one or more signature documents. The documents may be designated within the centralized repository. The documents may be designated as the most current version of the signature documents.

Figure 4:
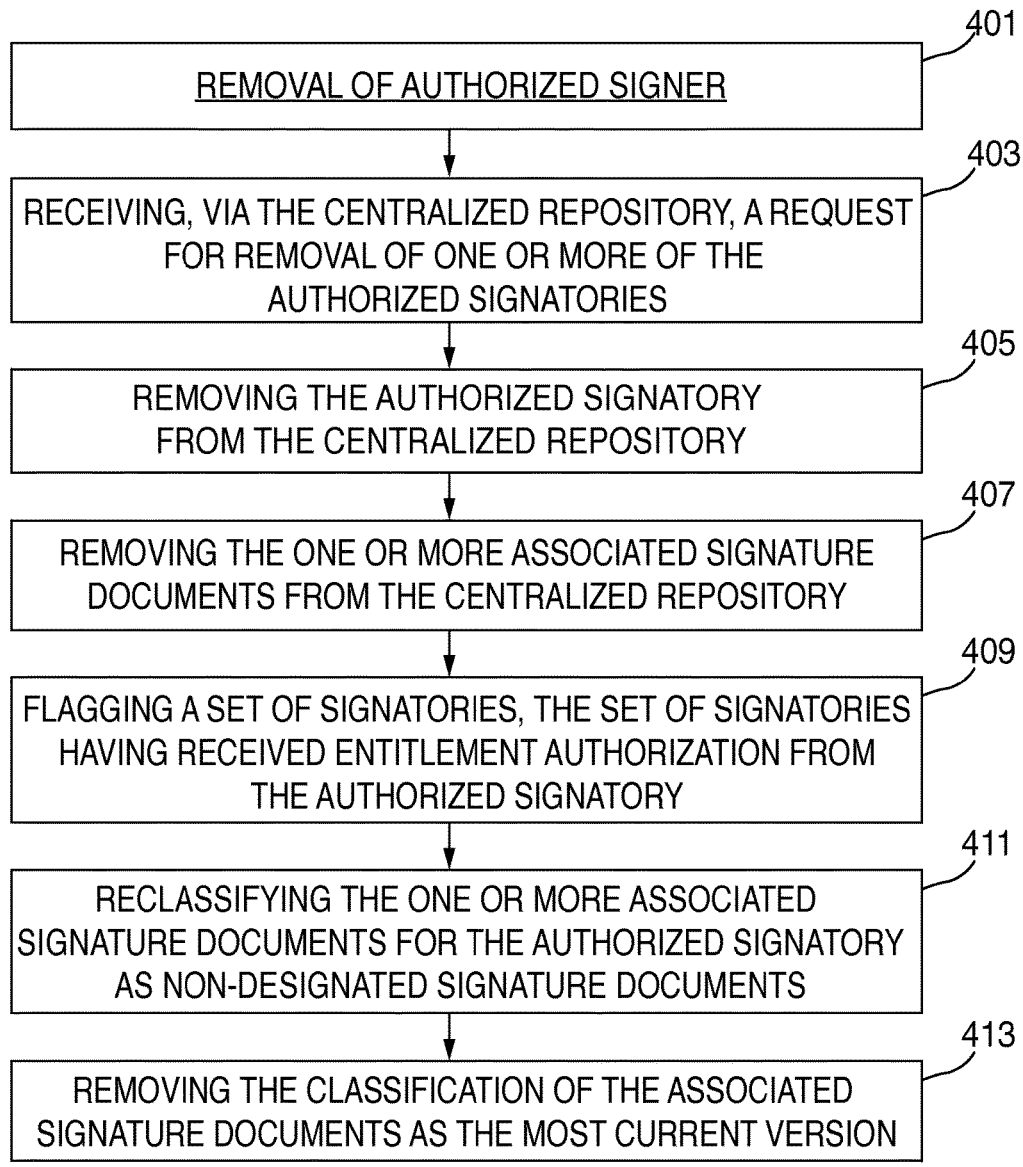
FIG. 4 shows another illustrative flow diagram in accordance with the principles of the invention.

FIG. 4 shows illustrative process 401 for removal of an authorized signer.

Process 401 may begin at step 403. At step 403, the system may receive a request. The request may be received via the centralized repository. The request may include a request for removal of one or more authorized signatories.

At step 405, the system may remove the authorized signatory from the centralized repository.

At step 407, the system may remove one or more associated signature documents. The signature documents may be removed from the centralized repository.

At step 409, the system may flag a set of signatories. The set of signatories may have received entitlement authorization. The entitlement authorization may have been received from the authorized signatory.

At step 411, the system may reclassify the one or more associated signature documents. The one or more associated signature documents may be reclassified for the authorized signatory. The one or more documents may be reclassified as non-designated signature documents.

At step 413, the system may remove a classification. The classification may be the classification of the associated signature documents. The associated signature documents may be classified as the most current version. The system may remove the classification of the associated signature documents as the most current version of the signature documents.

Figure 5:
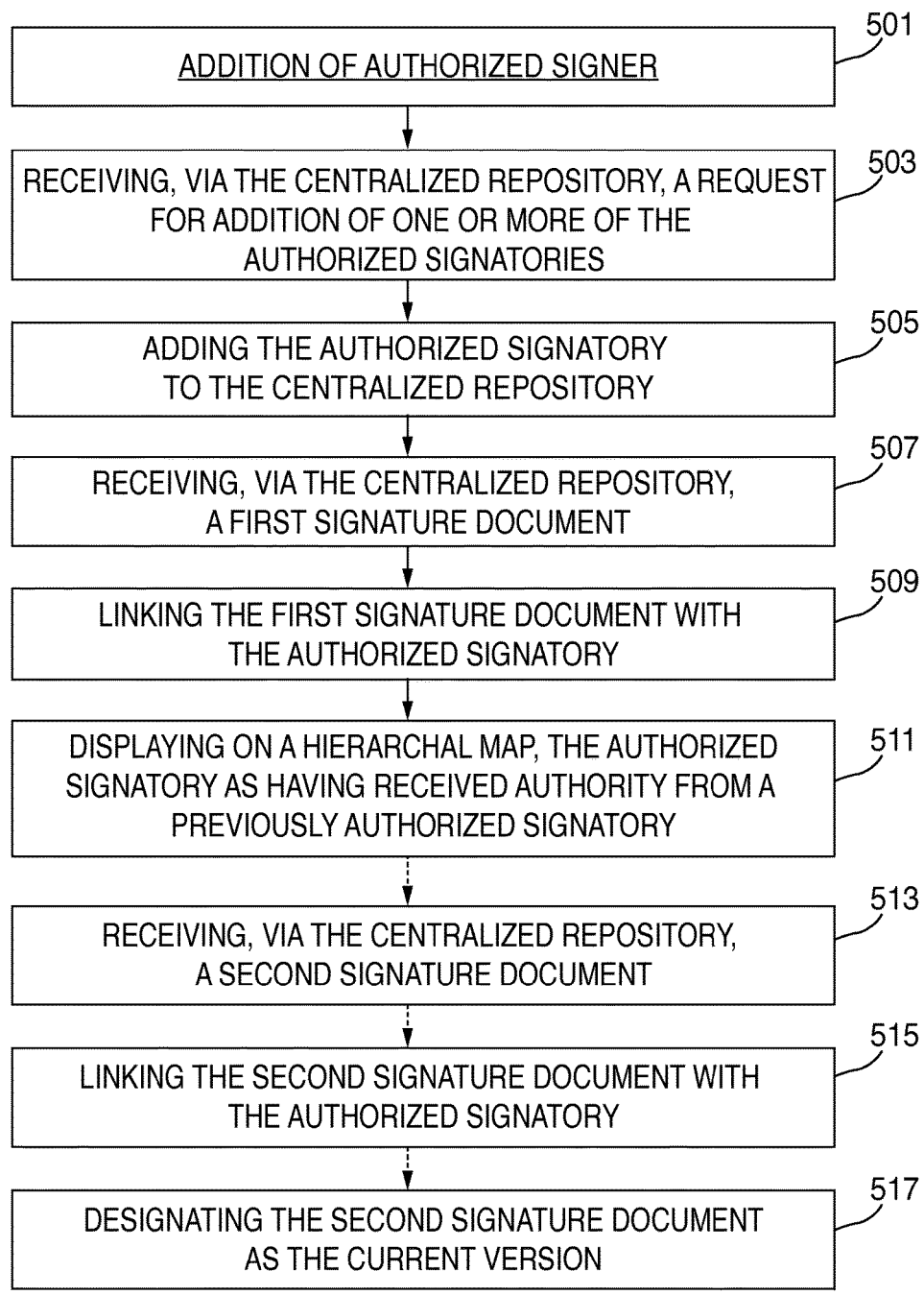
FIG. 5 shows yet another illustrative flow diagram in accordance with the principles of the invention.

FIG. 5 shows illustrative process 501 for addition of an authorized signer.

Process 501 may begin at step 503. At step 503, the system may receive a request for addition of one or more authorized signatories. The request may be received via the centralized repository.

At step 505, the system may add the authorized signatory to the centralized repository.

At step 507, the system may receive a document. The document may be a signature document. The document may be a first signature document. The document may be received via the centralized repository.

At step 509, the system may link the first signature document with the authorized signatory.

At step 511, the system may display information. The information may be displayed on a hierarchal map. The system may display authority received by the authorized signatory. The system may display the authorized signatory as having received authority from a previously authorized signatory.

At step 513, the system may receive a second document. The second document may be a second signature document. The second document may be received via the centralized repository.

At step 515, the system may link the second signature document with the authorized signatory.

At step 517, the system may designate the second signature document as the current version of signature documents.

Thus, methods and apparatus for maintaining a centralized repository that stores entitlement capability for authorized signatories are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for creating a centralized repository with entitlement capability for authorized signatories, the method comprising:
    creating a centralized repository, said centralized repository providing entitlement capability for one or more authorized signatories, wherein the centralized repository provides access to one more signature documents associated with the one or more authorized signatories; and
    receiving entitlement authorization for the one or more signatories; and
    displaying, on a display, a hierarchal display of the one or more authorized signatories, wherein the hierarchal display illustrates lines of authority from the one or more authorized signatories to each of their respective authorizers;
    aggregating within the central repository multiple versions of a signature document; and
    designating within the central repository which of the multiple versions of the signature documents are current versions which are not designated for signature and which is the most current version of the same signature documents and is designated for signature, wherein the entitlement capability of all of the signatories are stored in the centralized repository.

2. The method of claim 1 further comprising linking the one or more signatories to the one or more signature documents associated with the signatories.

3. The method of claim 2 further comprising aggregating, within the centralized repository, the one or more signature documents.

4. The method of claim 3 further comprising providing, within the centralized repository, access to the one or more signature documents.

5. The method of claim 4 further comprising designating all the signature documents within the centralized repository as the most current version of the signature documents.

6. A method for removing an individual as an authorized signatory, the method comprising:
    a processor receiving, via a centralized repository, a request to remove the individual as the authorized signatory; and
    removing the individual as the authorized signatory, wherein the removal comprises removing the individual as a listed authorized signatory in the centralized repository;
    aggregating within the central repository multiple versions of a signature document; and
    designating within the central repository which of the multiple versions of the signature documents are current versions which are not designated for signature and which is the most current version of the same signature documents and is designated for signature, wherein the entitlement capability of all of the signatories are stored in the centralized repository.

7. The method of claim 6 further comprising reclassifying one or more associated signature documents, said associated signature documents corresponding to authorized signatory documents for the individual, said reclassifying comprising categorizing the individual's authorized signatory documents as non-designated signature documents.

8. The method of claim 7 further comprising removing the classification of the associated signature documents, said classification comprising classifying the associated signature documents as the most current version of the associated signature documents.

9. The method of claim 8 further comprising removing the one or more associated signature documents from the centralized repository.

10. A method for adding an individual as an authorized signatory, the method comprising:
    a processor receiving, via a centralized repository, a request for addition of an individual as the authorized signatory;
    adding the individual as the authorized signatory;
    receiving, via the centralized repository, a first signature document; and
    linking the first signature document with the authorized signatory;
    aggregating within the central repository multiple versions of a signature document; and
    designating within the central repository which of the multiple versions of the signature documents are current versions which are not designated for signature and which is the most current version of the same signature documents and is designated for signature, wherein the entitlement capability of all of the signatories are stored in the centralized repository.

11. The method of claim 10 wherein the adding the individual as the authorized signatory comprises adding the individual as a listed authorized signatory in the centralized repository.

12. The method of claim 10 further comprising:
receiving, via the centralized repository, a second signature document; and
linking the second signature document with the authorized signatory.

13. The method of claim 12 further comprising designating the second signature document as the current version.

14. An apparatus for creating a centralized repository with entitlement capability for authorized signatories, the apparatus comprising:
a centralized repository, said centralized repository comprising a processor configured to provide entitlement capability for one or more authorized signatories, wherein the centralized repository provides access to one or more signature documents associated with the one or more authorized signatories; and
a receiver, said receiver configured to receive entitlement authorization for the one or more signatories; and
the central repository is configured to designate both the most current version of signature documents which are not designated for signature and all of the current versions of the same signature documents which are designated for signature, and
wherein the entitlement capability of all of the signatories are stored in the centralized repository.

15. The apparatus of claim 14 further comprising: a hard drive storing software configured to link the one or more signatories to the one or more signature documents associated with the signatories.

16. The apparatus of claim 15 wherein the centralized repository is further configured to aggregate the one or more signature documents.

17. The apparatus of claim 16 wherein the centralized repository is further configured to:
provide access to the one or more signature documents; and
designate the one or more signature documents as the most current version of the signature documents.

18. An apparatus for removing an individual as an authorized signatory, the apparatus comprising:
a transceiver, said transceiver configured to:
receive a request to remove the individual as the authorized signatory in a centralized repository;
transmit a request to remove the individual as the authorized signatory, wherein the removal comprises removing the individual as a listed authorized signatory in the centralized repository; and
transmit an instruction to reclassify one or more associated signature documents, said associated signature documents corresponding to authorized signatory documents for the individual, wherein said instruction to reclassify comprises categorizing the individual's authorized signatory documents as non-designated signature documents; and
the central repository is configured to designate both the most current version of signature documents which are not designated for signature and all of the current versions of the same signature documents which are designated for signature, and
and wherein the entitlement capability of all of the signatories are stored in the centralized repository.

19. The apparatus of claim 18 wherein the transceiver is further configured to:
receive an instruction to remove the classification of the associated signature documents, said classification comprising classifying the associated signature documents as the most current version of the associated signature documents; and
transmit an instruction to remove the one or more associated signature documents from the centralized repository.

* * * * *